United States Patent

Fuwa

[15] 3,654,478

[45] Apr. 4, 1972

[54] RADIATION SENSITIVE CARD READER WITH COMPENSATION FOR OPTICAL CONTAMINATION OF THE SYSTEM

[72] Inventor: Zyoichi Fuwa, Tokyo, Japan

[73] Assignee: Kabushiki Kaisha Ricoh, Tokyo, Japan

[22] Filed: Feb. 9, 1970

[21] Appl. No.: 9,608

[30] Foreign Application Priority Data

Feb. 14, 1969 Japan....................................44/10829

[52] U.S. Cl...........................250/219 DC, 250/206, 307/311, 235/61.11 E

[51] Int. Cl.............................................................G08c 9/06

[58] Field of Search................250/219 D, 219 DC, 227, 206, 250/214, 211, 212; 235/61.11 E; 356/71; 307/311, 117

[56] References Cited

UNITED STATES PATENTS

| | | | |
|---|---|---|---|
| 3,189,745 | 6/1965 | Van Reymersdal | 250/219 DC X |
| 3,321,637 | 5/1967 | Beltz et al. | 250/219 DC X |
| 3,560,751 | 2/1971 | Buettner | 250/214 |
| 2,804,574 | 8/1957 | Kingsbury | 250/206 X |
| 3,028,499 | 4/1962 | Farrall | 250/212 X |
| 3,265,900 | 8/1966 | Smith | 250/219 X |
| 3,461,300 | 8/1969 | Braun | 250/219 |

*Primary Examiner*—Walter Stolwein
*Attorney*—Burgess, Ryan & Wayne

[57] ABSTRACT

A card reader having a light source for illuminating cards and photoelectric cells for read-out. The photoelectric cells are so arranged that they read out the space between the adjacent columns of a card when it is at rest and read out the information on the card when it is being advanced. A load resistance is coupled to each of the photoelectric cells in such a manner that the logarithm of the brightness or luminance of the light intercepted by the photoelectric cell is substantially in proportion to the output voltage. Means for eliminating DC components such as capacitors are used in coupling photoelectric cells to an amplifier for amplifying the output signals of the photoelectric cells and in coupling the stages of the amplifier to each other. The card reader is stable in operation without being adversely affected by the contamination of the optical system of the photoelectric cells, the brightness of the card, the ambient temperature variation, etc.

7 Claims, 6 Drawing Figures

RADIATION SENSITIVE CARD READER WITH COMPENSATION FOR OPTICAL CONTAMINATION OF THE SYSTEM

BACKGROUND OF THE INVENTION

The present invention relates to a card reader and more particularly a card reader in which the characteristics of photoelectric cells and an amplifier are suitably coupled, thereby ensureing the stable reading operation. The terms brightness and luminance are used synonymously with one another in the specification.

In electronic data processing system, card readers are widely used. The optical marks or punched holes of the cards representative of the information are optically read out and fed into the data processing system.

In the card readers, the cards are intermittently or continuously advanced. When the cards are intermittently advanced, the optical signals derived from reading out the holes or marks on the cards are transduced into electrical signals which are amplified to a desired magnitude then reshaped and derived as output. To read out the marks on the card, the light reflected by the card is condensed, but the reflected light intercepted by the photoelectric cells is generally weak, so that the signals are also weak. Thus, a high-gain amplifier is required. Furthermore, since the signals are random pulses, a directly-coupled amplifier is generally used (but a high-gain directly-coupled amplifier which ensures stable operation is complicated and expensive). In this case, the brightness of the light intercepted by the photoelectric cell, that is brightness of the surface of the card is derived as an output in absolute value, so that the output is directly adversely affected by the reduction in brightness of the light source, the contamination of the optical system, etc., resulting in the instability of the reading operation. There has been proposed a method for electrically eliminate these defects, but the circuit is much complicated.

In view of the above, one of the objects of the present invention is to provide a very high sensitive and stable card reader which is not adversely affected by the optical components.

Another object of the present invention is to provide a card reader whose operation is not adversely affected by the dispersion of the brightness over the surface of a card.

A further object of the present invention is to provide a card reader whose operation is not affected by the environmental temperature.

A still further object of the present invention is to provide a card reader which is inexpensive to manufacture.

SUMMARY OF THE INVENTION

In brief, the present invention provides a card reader including a light source for illuminating cards and photoelectric cells for reading out the cards wherein the photoelectric cells read out the space between the adjacent columns when said card is at rest, to said photoelectric cells are coupled load resistors so that the output voltage from each of said photoelectric cells may become substantially in proportion to the logarithm of a brightness of the light intercepted by said photoelectric cell, and said photoelectric cells are coupled to an amplifier for amplifying the outputs of said photoelectric cells and the adjacent stages of said amplifier are coupled to each other through means which is adapted to eliminate DC components.

The features of the present invention are as follows:

1. A load resistance is coupled to each of photoelectric cells in such a manner that $dV_o/d \log L$ of the cell such as a silicon photocell may be maintained constant over a wide range of low brightness region, where $V_o$ output voltage and $L$ = brightness or luminance of the light intercepted by the cell.

2. As a signal amplifier is used an AC amplifier in which means for eliminating DC components such as capacitors are used in coupling photoelectric cells to a pre-stage of the amplifier and in coupling the stages of the amplifier to each other.

In accordance with the present invention, photoelectric cells, whose $\gamma$ = constant, are combined with an amplifier whose stages are coupled to each other through means which can eliminate the DC components, so that the operation of a card reader in accordance with the present invention is not adversely affected by the contamination of the optical system thereof.

Furthermore, remarkable advantages are attained as follows:

1. The card reading operation is not adversely affected by the reduction in brightness of a card illuminating lamp.

2. The operation is not adversely affected by the dispersion in brightness of bits on a card.

3. An amplifier is simple in construction and inexpensive to manufacture.

4. The amplifier is not affected by drifts.

5. The operation is not adversely affected by the variation in brightness of the illumination lamp due to the voltage variation.

6. The operation is not affected by the contrast of the card base.

7. Since the variation of the characteristic of the photoelectric cell due to the temperature variation is substantially parallel as shown in FIG. 4, for example in a silicon photocell, the operation is not affected by the temperature variation.

The above and other objects, features and advantages of the present invention will become more apparent from the description of one illustrative embodiment thereof taken in conjunction with the accompanying drawing.

BRIEF DESCRIPTION OF THE DRAWING

Throughout the figures, same parts are designated by same reference numerals.

DESCRIPTION OF THE PREFERRED EMBODIMENT

Figure 1:
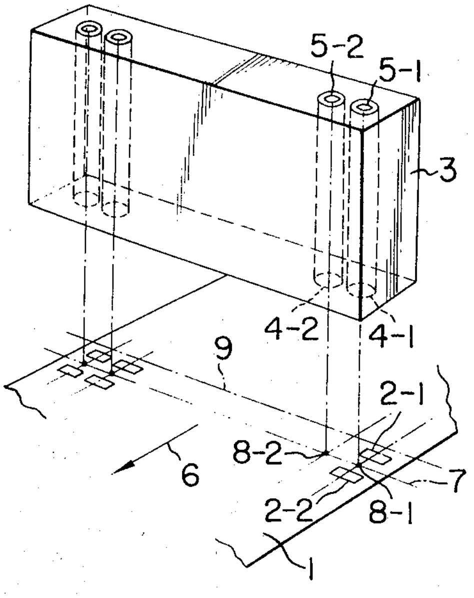
FIG. 1 is a perspective view illustrating only the essential part of one embodiment of the present invention.

Referring to FIG. 1 illustrating the major section of one embodiment of the present invention, a card 1 bearing the data to be read out is intermittently advanced in the direction indicated by the arrow 6. In FIG. 1 the card 1 is at rest so that the points 8-1, 8-2 and so on, along the line 7 on the card 1 are focused through lenses 4-1, 4-2 and so on, on the photosensitive surfaces of photoelectric cell means 5-1, 5-2 and so on.

Figure 2:
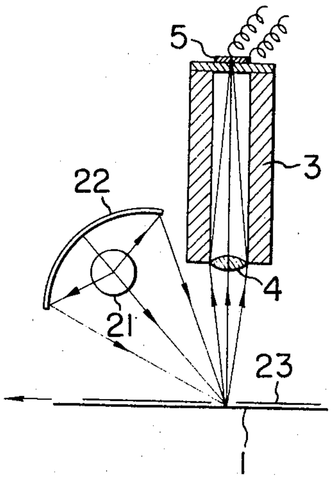
FIG. 2 is a sectional view thereof.
Figure 5:
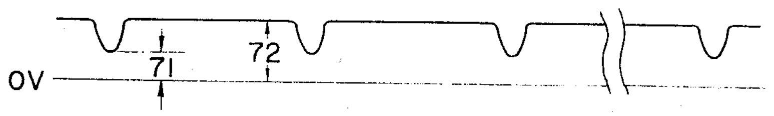
FIG. 5 is a graph illustrating the waveform of the output voltage of the photoelectric cell.

Referring to FIG. 2 illustrating the major section of the embodiment of the present invention in cross-sectional view, the card 1 is illuminated by a light source 21. A plurality of optical marks representative of the information are marked within one column or entry spaces 2-1, 2-2 and so on, arranged at right angles with respect to the direction of advancement of the card 1. These optical marks are read out simultaneously. That is, when read command has been received from a control circuit (not shown), the card 1 is advanced by one pitch from the line 7 to the line 9. Therefore, during the advancement of the card 1, the photoelectric cells 5-1, 5-2 and so on, scan one column (one information unit) on the card 1, so that the data signals are derived from the photoelectric transducers which face the optical marks in the column. In other words only when the card 1 is being advanced, a small voltage (see 71, in FIG. 5) corresponding to a dark mark on the card 1 is derived for example from the photoelectric transducer 5-1 while a high output voltage (see 72 in FIG. 5) is derived from the photoelectric cell facing the card base, that is the surface of the card 1 having no optical mark. FIG. 5 is a graph of the output waveform of the photoelectric transducer.

Figure 4:
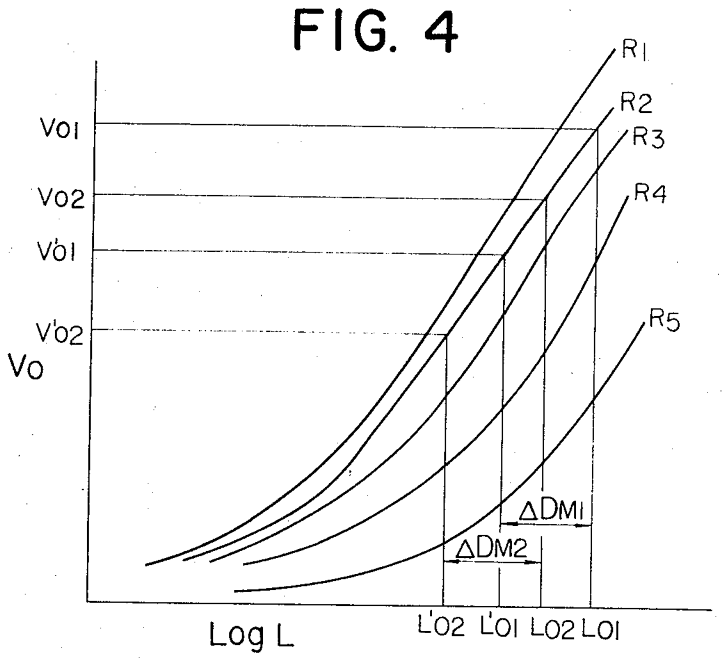
FIG. 4 is a graph illustrating the relation between the brightness of the light intercepted by a photoelectric cell and the output voltage thereof.

The relation between the brightness of the light intercepted by the photoelectric cell such as a silicon photocell and its output voltage is shown in FIG. 4 where the load R1, R2, R3, R4, and R5 are different load parameters. It has been a well known fact that $\gamma = dV_o/d \log L$ remains unchanged over a wide range of low brightness when a suitable load is selected. Therefore, the photoelectric cell is used within a range where $\gamma$ is maintained constant; and a circuit for eliminating the DC component is provided in a signal amplifier, so that the stabilized reading of the marks can be ensured without being adversely affected by the absolute value of the brightness of the card surface. As shown in FIG. 4, the brightness or luminance of the light intercepted at the photoelectric cell corresponding to the brightness of the card base is assumed to be $L_{o1}$. Then the output voltage corresponding to this brightness $L_{o1}$ when a load resistance of the photoelectric transducer is $R_2$ becomes $V_{o1}$. When an optical mark having a contrast difference $\Delta_{DM} = D_{MO} - D_c$ (where $D_c$ = contrast of the card base and $D_{Mo}$ = contrast of the mark) is read out, the brightness or luminance of the light intercepted by the photoelectric cell will be $L'_{o1}$ and the output voltage becomes $V'_{o1}$, so that the output of the amplifier is in proportion to $\Delta V = V_{o1} - V'_{o1}$, where $\Delta D_M = \log L_{o1} - \log L'_{o1}$. Let it be assumed that the brightness or luminance of the light intercepted by the photoelectric cell is reduced to $L_{o2}$ because the surface of the card is stained. When the mark having the contrast difference $\Delta D_M$ is read out, the brightness of the light intercepted by the photoelectric cell will become $L'_{o2}$. Since $\Delta D_M$ remains unchanged, $L'_{o1}/L_{o1} = L'_{o2}/L_{o2}$ This means $$\log L_{o1} - \log L'_{o1} = \log L_{o2} - \log L'_{o2}.$$

In FIG. 4, $\Delta D_{M1} = \Delta D_{M2} = \Delta D_M$ and since the gradient of the curves is constant within the service range, $$\Delta V = V_{o1} - V'_{o1} = V_{o2} - V'_{o2}$$

In order to amplify $\Delta V$, the amplifier amplifies only the AC components of the input voltage and eliminates the DC component, so that the output of the amplifier is equal to that when the brightness of the light intercepted by the cell is $L_{o1}$. That is, as long as $\Delta D_M$ remains constant, the output of the amplifier is always constant without being adversely affected by the contamination of the optical system, so that the correct reading out of marks can be ensured all the time.

Figure 3:
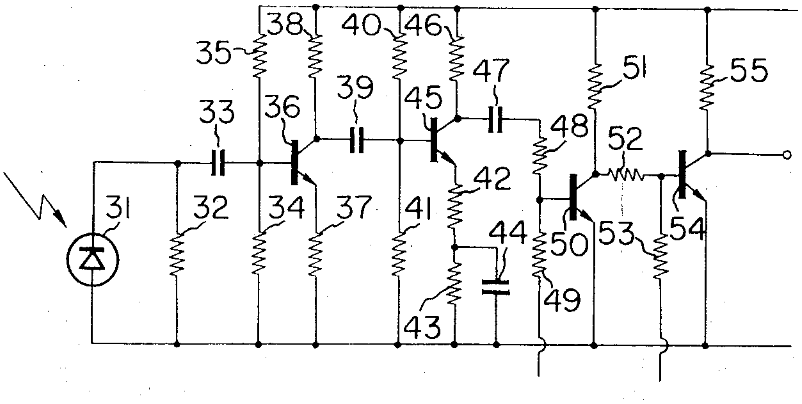
FIG. 3 is a circuit diagram of one embodiment of a signal amplifier in accordance with the present invention.
Figure 6:
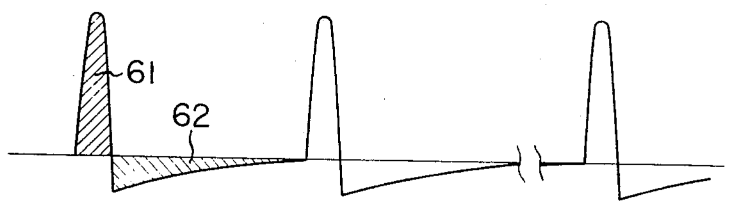
FIG. 6 is a graph illustrating the waveform of the output of the amplifier.

Referring to FIG. 3 illustrating a circuit diagram of one embodiment of a card reader amplifier, the output voltage of the photoelectric cell 31 is derived across the resistor 32. A pre-stage including the resistors 34, 35, 37 and 38 and a transistor 36 is coupled through a capacitor 33 to the resistor 32 in an AC manner, so that the DC component of the output of the phototransducer 31 is not applied to the amplifier. A capacitor 39 is interposed between the pre-stage and the second stage including resistors 40, 41, 42, 43 and 46, a capacitor 44 and a transistor 45. A capacitor 47 is interposed between the second stage and a wave shaping circuit including resistors 48, 49, 51, 52, 53 and 55 and a transistors 50 and 54. Therefore, the output variations or drifts across the output terminals of the amplifier stages will not affect the next stages. Since the stages of the amplifier are coupled to each other through the capacitors, the collector output waveform of the transistor 45 becomes becomes the one as shown in FIG. 6. The coupling capacitor which is charged or discharged upon readout of a mark is discharged or charged when the card is at rest, thereby returning to its normal condition. In FIG. 6, the output when a mark is read out is designated by 61 which also indicates the charging or discharging time of the coupling capacitor and reference numeral 62 designates a discharging or charging time.

The present invention has been so far described as the card being intermittently advanced, but it will be understood that the present invention can be applied to the case where the card is continuously advanced.

I claim:

1. In an optical reader for use with cards having a background of one light reflective intensity and marks on said cards of different light reflective intensity, a photo electric cell for receiving the reflected light therefrom, said reflected light from the card background establishing a reference intensity signal, the improvement comprising of said photo electric cell having the following characteristics: $\gamma = d\,\text{Vo}/d \log \text{Lo}$ where "Vo is an output electrical signal from said cell, and "Lo" is the luminance of the light received by said cell; means consisting of linear elements for biasing said photo electric cell in a region where the "$\gamma$." is constant; and means connected to said photo electric cell for amplifying only an alternating component of said output signal from said photo electric cell.

2. In an optical reader for use with cards having a background of one light reflective intensity and marks on said cards of different light reflective intensity, a light source for directing light onto said cards, and a photo electric cell for receiving the reflected light therefrom, said reflected light from the card background establishing a reference intensity signal, and said reflected light from the marks being of a different intensity and randomly varying in accordance with the random marks, the improvement comprising a photo electric cell having the following characteristics: $\gamma = d\,\text{Vo}/d \log \text{Lo}$ where "Vo" is an output electrical signal from the cell and "Lo" is the luminance of the light received by the cell; means consisting of linear elements for biasing said photo electric cell in a region where the "$\gamma$" is constant; and means connected to the photo electric cell for amplifying only an alternating component of the output signal from the photo electric cell, whereby the alternating output signal from the reader is of constant amplitude pulses regardless of drift variations in the light intensity reflected from the cards or the frequency of occurrence of the marks on the card.

3. An optical reader for cards having optically discernible indicia arranged in columns thereon, comprising light source for illuminating the cards as they are read; photo electric cell means for receiving said illumination from the cards and for providing a DC reference output signal when said received illuminations is from spaces between adjacent columns of indicia; and providing alternating output signals when said received illumination is from said optically discernible indicia; linear resistive biasing means coupled to said photoelectric cell means for biasing said photoelectric cell in an operable region where said alternating output signals are substantially in proportion to the change of the logarithm of the luminance of the illumination received by said photoelectric cell means; and amplifier means coupled to said photoelectric cell means for amplifying said signals from said photoelectric cell means, said amplifier means including adjacent stages coupled to each other and means for eliminating the DC components of said signals.

4. A card reader as specified in claim 5 wherein said DC component eliminating means is a capacitor.

5. A card reader as specified in claim 3, wherein means are provided for intermittently advancing said cards which are normally at rest with the space between the adjacent indicia columns being read by the photoelectric cell means.

6. A card reader as specified in claim 3, comprising means for continuously advancing said cards.

7. A reader according to claim 3 wherein said photoelectric cell means include at least one silicon photocell and its operation is not affected by temperature variation.

* * * * *